April 16, 1968   HIROMU SASAKI   3,378,350
METHOD FOR GROWING SINGLE CRYSTALS OF VANADIUM DIOXIDE
Filed June 1, 1965   2 Sheets-Sheet 1
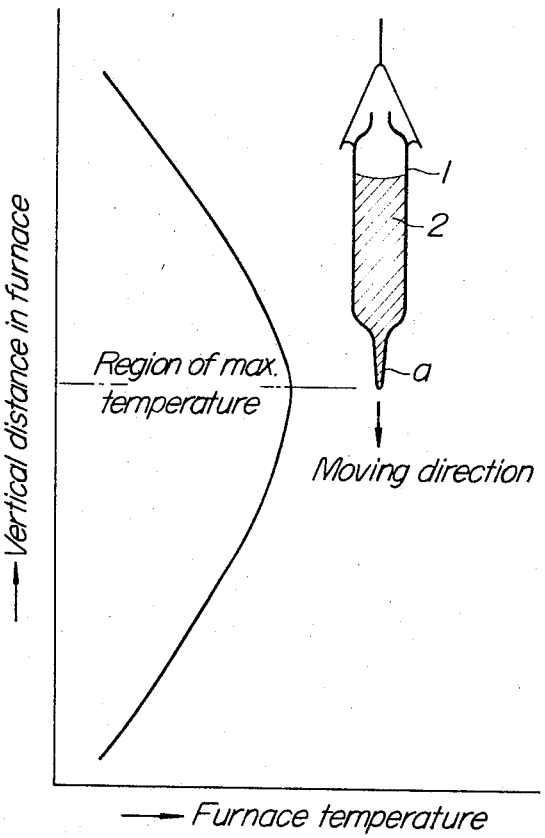
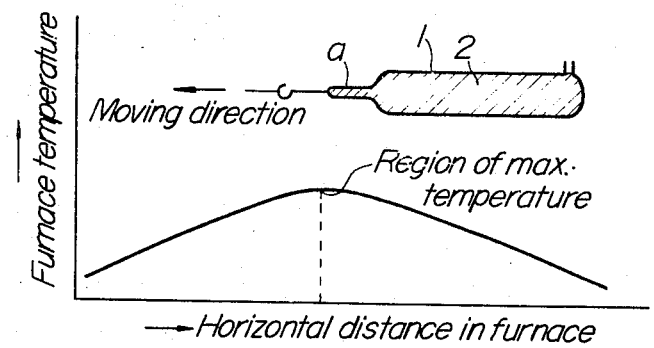
INVENTOR
Hiromu Sasaki

United States Patent Office

3,378,350
Patented Apr. 16, 1968

3,378,350
METHOD FOR GROWING SINGLE CRYSTALS OF VANADIUM DIOXIDE
Hiromu Sasaki, Osaka, Japan, assignor to Matsushita Electric Industrial Co., Ltd., Osaka, Japan, a corporation of Japan
Filed June 1, 1965, Ser. No. 460,318
Claims priority, application Japan, June 2, 1964, 39/31,511; July 1, 1964, 39/37,856; Aug. 14, 1964, 39/46,962
10 Claims. (Cl. 23—301)

ABSTRACT OF THE DISCLOSURE

A method for growing single crystals of vanadium dioxide ($VO_2$) comprising heating vanadium pentoxide in an inert gas atmosphere at a temperature between the melting points of vanadium pentoxide and vanadium dioxide and maintaining the molten vanadium pentoxide at said temperature in said inert gas atmosphere so as to grow single crystals of vanadium dioxide in the molten vanadium pentoxide. The melt temperature is preferably above 900° C., and the crystals obtained range up to 13 mm. in length.

---

This invention relates to a method for growing single crystals of vanadium dioxide which show an abrupt change in its electrical resistance at a certain temperature.

It is known that among many oxides of vanadium, vanadium dioxide (hereinafter to be called $VO_2$ for short) shows an abrupt decrease in its electrical resistance at about 65° C. when it is heated up from room temperature. The above fact has already been studied by Morin, who reported that the electrical resistance of $VO_2$ is decreased by about 2.5 orders of magnitude in the temperature range from 65° to 80° C. (the Physical Review letters, vol. 3, 1959, p. 34).

Several methods for preparing $VO_2$ powder have been proposed and put into practice. The method most commonly employed among these ones is to heat an equimolar mixture of vanadium pentoxide (hereinafter to be called $V_2O_5$ for short) and vanadium sesquioxide (hereinafter to be called $V_2O_3$ for short) for a long period of time in a vacuum or in an inert atmosphere. Since vanadium is a transition metal, its oxide composition (the ratio of oxygen to vanadium) is liable to vary depending on the preparation conditions. This tendency should be marked in the case of $VO_2$ because of the facts that this variation in its composition exerts a great influence on its electrical resistance decrease at the transition point. In polycrystalline masses of $VO_2$, the abrupt decrease in the electrical resistance is more or less impaired by the distribution of the composition. Therefore when the composition is close to a stoichiometric one, a large and rapid decrease of the electrical resistance can well be expected at the transition point. The large and rapid decrease of electrical resistance at 65° C. will lead to a possibility of new application of $VO_2$ to some electrical devices.

A method called hydrothermal synthesis has heretofore been practised to grow $VO_2$ single crystals in the art (Solid State Physics, vol. 12, 209, Academic Press). According to this method, $VO_2$ powder is at first prepared and the powder is dissolved in an aqueous alkaline solution at a temperature of 400° C. and under a pressure of 1,300 kg. per cm.$^2$ using a bomb. It was reported that a $VO_2$ single crystal of 0.8 mm. was obtained by this method. It will thus be known that the prior method of hydrothermal synthesis is unsatisfactory, for it requires an extremely large-scale growing equipment to preserve such a high pressure. Yet, the single crystals of $VO_2$ obtained were in the order of 0.8 mm. in size.

It is therefore the primary object of the present invention to provide an improved method for growing single crystals of $VO_2$ without requiring any large-scale equipment.

According to the present invention, there is provided a method for growing a single crystal of $VO_2$ comprising melting and deoxidizing $V_2O_5$, and precipitating $VO_2$ in a solid state from the molten $V_2O_5$ utilizing the difference between the melting points of $V_2O_5$ and $VO_2$.

The advantages and features of the present invention will be described with reference to the accompanying drawings, in which:

FIG. 1 is a schematic illustration of one form of the present invention;

FIG. 2 is also a schematic illustration of another form of the present invention;

Figure 3:
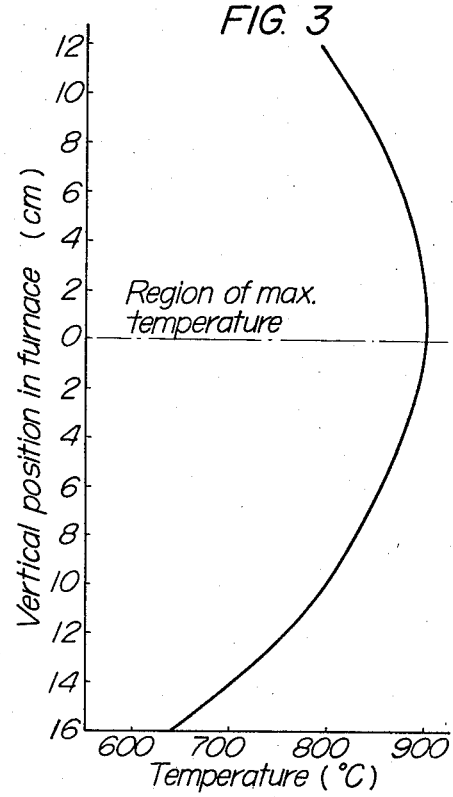
FIG. 3 is a graphical representation of a temperature gradient in a vertical furnace employed in one embodiment of the present invention.

$V_2O_5$ is the most usual compound in the oxides of vanadium. This $V_2O_5$ has a melting point of 690° C., while $VO_2$ has a melting point of 1,700° C. Therefore, if a molten $V_2O_5$ can gradually be converted to $VO_2$ under an appropriate condition, the $VO_2$ formed will be precipitated as a solid phase from the $V_2O_5$ melt. This process may be considered as a kind of crystallization from a heterogeneous system. The present invention is based on this way of thinking and will be described in detail hereunder.

$V_2O_5$ powder is charged in a vessel of alumina, quartz or platinum and is heated for five to ten days at a temperature ranging from 900° to 1,150° C. in a flow of nitrogen, argon or carbon dioxide gas being substantially free from oxygen. The vessel may be placed in an electric furnace of either vertical or horizontal type and an automatic temperature regulator may be employed to maintain the temperature in the heating zone constant. After melting the $V_2O_5$ for five to ten days, the furnace is cooled at a rate of 50° C. per hour so that cracks may not develop in the crystals grown. A small amount of the $VO_2$ crystals are seen being embedded in a great amount of the solidified $V_2O_5$. The $VO_2$ single crystals are formed in a central portion or at the bottom of the vessel or near the surface of the solidified melt depending on the heating temperature. After the growing run, the solidified mass is taken out from the vessel carefully and is immersed in a dilute aqueous solution of sodium carbonate or ammonia for two or three days at room temperature. By this treatment, $V_2O_5$ in the mass is dissolved in the solution and the $VO_2$ crystals remain being undissolved in a prismatic or chunky form. Then the $VO_2$ single crystals are sufficiently washed with water and dried. In addition to the crystal growing method by spontaneous nucleus formation mentioned above, the method using seed crystals can also be applicable for growing $VO_2$ crystals. It has been found that the single crystals obtained by the above described methods have close to a stoichiometric composition of $VO_2$.

Various examples of the present invention will now be described with reference to the drawings.

Example 1

Substantially dried $V_2O_5$ powder was charged in a platinum vessel and the vessel was placed in an electric furnace kept at 900° C. A flow of nitrogen gas completely free from moisture and oxygen was introduced into the furnace. At this temperature, $V_2O_5$ is in a completely molten state and the heating treatment was continued for ten days. During the period, $V_2O_5$ gradually converted to $VO_2$ while liberating a portion of its oxygen slowly and the $VO_2$ formed crystallized in the $V_2O_5$ melt. After the ten days, the furnace was slowly cooled down to room temperature at a rate of 50° C. per hour. This slow cooling is based on the consideration that cracks may not develop in the $VO_2$ single crystals due to thermal shock. Then the solidified mass of $VO_2$ single crystals and unchanged $V_2O_5$ was taken out from the vessel and was immersed in dilute aqueous solution of ammonia for two or three days at room temperature whereby $V_2O_5$ was completely dissolved in the solution leaving the $VO_2$ single crystals. These $VO_2$ single crystals were then sufficiently washed with distilled water and dried. The single crystals obtained have a prismatic shape and can conveniently be used for the measurements of their properties along its longitudinal direction which corresponds to crystallographic direction of [100] in monoclinic system. A single crystal having dimensions of 1 x 1 x 10 mm. can easily be obtained by this method.

*Example 2*

This procedure is substantially similar to that in Example 1 except for temperature and time which were, respectively, 1,150° C. and four days. The higher temperature results in a relatively fast rate of the $VO_2$ formation. $VO_2$ single crystals grew also near the surface of the $V_2O_5$ melt. The $VO_2$ single crystals thus grown are in the chunky form being different from the prismatic form described in the first example. These chunky single crystals grown at 1,150° C. can far advantageously be utilized for measurement along any direction, whereas the prismatic-shaped crystals have some restrictions.

Preferred growing conditions in the present example comprised melting for five days in a nitrogen flow at 1,150° C. Treatments thereafter were quite similar to those in the first embodiment, that is, the $V_2O_5$ melt was slowly cooled down to room temperature and was then subjected to the treatment with dilute aqueous solution of ammonia to separate the $VO_2$ single crystals from the $V_2O_5$ melt. The chunky crystals of $VO_2$ obtained by this method are so large that a piece of crystal having a size of 5 x 5 x 5 mm. could be cut therefrom.

*Example 3*

In the Examples 1 and 2, the vessel containing $V_2O_5$ therein is placed at the fixed position in the furnace during the crystal growth duration. In the present embodiment, the vessel was moved in the heating zone of the electric furnace. The $V_2O_5$ powder 2 was charged in a vessel which was designated by reference numeral 1 in FIG. 1 or 1' in FIG. 2. The vessel 1 or 1' was at first placed at a certain position in a vertical furnace of FIG. 1 or in a horizontal furnace of FIG. 2 having a temperature gradient as shown in respective figures in a manner that the tip portion $a$ of the vessel is disposed at the position of maximum temperature. An inert gas such as nitrogen or argon was introduced into the furnace so that the atmosphere in the furnace was completely free from oxygen. The region of maximum temperature in the furnace was selected to be higher than at least 690° C., the melting point of $V_2O_5$. Selection of this temperature must carefully be made because this temperature influences on the rate of growth of the $VO_2$ single crystals. On the other hand, when the temperature is excessively high, there forms a crystal in which the ratio of oxygen to vanadium is less than 2. Taking all of these points into consideration, the region of maximum temperature in the temperature gradient in the furnace was kept at 900° C. and the vessel containing $V_2O_5$ therein was moved along the arrow in FIG. 1 or 2 at a rate of 5 mm. per day. Since atmosphere in the furnace was free from oxygen, $V_2O_5$ gradually lost its oxygen and $VO_2$ precipitated therefrom. This reaction may be given by the following expression.

$$V_2O_5 \rightarrow 2VO_2 + \tfrac{1}{2}O_2$$

The rate of this reaction is highest at the maximum temperature portion of the vessels 1 and 1'. Therefore $VO_2$ starts to precipitate at the portions $a$ in FIGS. 1 and 2. Among the crystal nuclei formed in the narrow portion $a$ of the vessel, only a few crystal nucleus survive. If one of them has its easy-growing axis along the direction opposite to the arrow, and the formed $VO_2$ is successively deposited on the one crystal nuclei, one large single crystal of $VO_2$ can be grown.

*Example 4*

This embodiment provides a more materialized form of $VO_2$ crystal growing method than the above Example 3. FIG. 3 shows a temperature gradient when the maximum temperature in the vertical furnace employed was kept at 900° C. Oxygen in the furnace was sufficiently expelled and a nitrogen flow was introduced into the furnace. A vessel had a shape substantially similar to the vessel 1 in FIG. 1 as illustrated in the Example 3. After $V_2O_5$ was charged in the vessel, it was hung in the furnace in a manner that the bottom of the vessel is disposed slightly above the position of maximum temperature. After hanging the vessel at this position for about two hours, the vessel was moved downwards at a rate of about 5 mm. per day. Since length of the vessel was about 10 cm., about twenty days were required to lower the 10 cm. The moving velocity was increased thereafter and the vessel was then cooled to room temperature. The single crystals thus obtained were examined by X-ray diffraction analyses and they were confirmed to be $VO_2$ whose lattice constants showed an exact coincidence with the values reported in prior literature. The largest single crystal obtained in this experiment had a length of 10 mm.

*Example 5*

$VO_2$ single crystals in any of the Examples 1, 2, 3 and 4 grow being embedded in the $V_2O_5$ melt. In these examples therefore, treatment with a dilute aqueous solution of ammonia is necessary to separate $VO_2$ crystals from the $V_2O_5$ melt. For the purpose of obviating such treatment, this embodiment employs a method in which small single crystals of $VO_2$ prepared previously are used as a seed crystal. After these seed crystals have sufficiently grown, they are withdrawn from the $V_2O_5$ melt.

Figure 4:
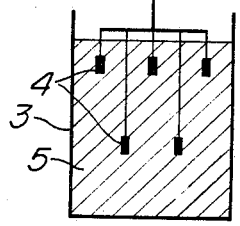
FIG. 4 is a schematic illustration of a further form of the present invention.

According to this example, $V_2O_5$ powder was charged in a platinum vessel 3 just like the previous embodiments and was sufficiently molten in an electric furnace kept at 1,000° C. In the meantime, the seed crystals of $VO_2$ 4 were immersed in the $V_2O_5$ melt 5 as shown in FIG. 4. $VO_2$ single crystals grown in accordance with the above examples were used as the seed crystals. A nitrogen flow which was substantially anhydrous and free from oxygen was introduced into the furnace. $V_2O_5$ was kept in a molten state under such circumstance for one week, during which period the conversion of $V_2O_5$ to $VO_2$ proceeded. The $VO_2$ formed during this period by the deoxidizing reaction deposited on the seed crystals. After one week, these grown crystals were withdrawn from the $V_2O_5$ melt. Thereafter the crystals were slowly cooled to room temperature. The surfaces of the crystals grown were almost from from sticking of $V_2O_5$. In this procedure, a seed crystal of 2 x 0.5 x 0.5 mm. could be grown to 5 x 3 x 3 mm.

*Example 6*

This example also utilizes seed crystals of $VO_2$ similar to Example 5. As shown in FIG. 4, $V_2O_5$ powder and several seed crystals 4 were placed in a platinum vessel 3 and were heated in an electric furnace at 1,100° C. while flowing nitrogen or argon gas substantially free from oxygen. After heating for ten days, the single crystals of $VO_2$ were withdrawn from the $V_2O_5$ melt 5 and the furnace was cooled at a rate of 50° C. per hour. It was observed that VO$_2$ formed by the deoxidizing reaction deposited on the seed crystals 4 and they grew larger than the initial size.

Example 7

Figure 5:
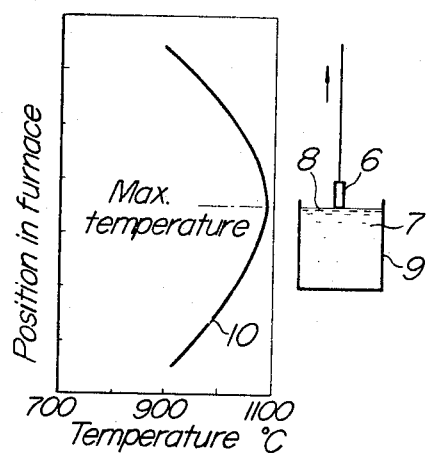
FIG. 5 is a schematic illustration of a still further form of the present invention.

Operating conditions employed in this embodiment are substantially similar to those employed in Examples 5 and 6. This embodiment provides a method in which a seed crystal 6 is brought into contact with the surface 8 of the V$_2$O$_5$ melt 7 as shown in FIG. 5 and the seed crystal is gradually raised keeping the contact. This raising rate must be balanced with a rate of VO$_2$ deposition on the seed crystal and a growth rate less than a certain value which is required for the growth of single crystal. Therefore the appropriate raising rate is closely related to the suface area of the V$_2$O$_5$ melt, melting temperature, cross-sectional area of the seed crystal, etc. For example, the raising rate was about 5 mm. per day when a platinum vessel of 20 mm. in diameter and a VO$_2$ seed crystal of about 2 mm. in diameter were used and heating temperature was 1,000° C. The VO$_2$ single crystal obtained had a diameter about twice that of the seed crystal and a length of 13 mm.

Example 8

This procedure is similar to that described in Example 7. V$_2$O$_5$ powder is placed in a vessel 9 of alumina, quartz or platinum as shown in FIG. 5 and is molten at 1,100° C. while supplying a nitrogen or argon gas substantially free from oxygen. A vertical-type furnace having a temperature gradient as shown by curve 10 is employed and the vessel 9 is fixed in a manner that the surface of the V$_2$O$_5$ melt in the vessel is disposed at the maximum temperature in the temperature gradient. Then, a small single crystal of VO$_2$ as previously prepared is slowly moved downwards until its lower end contacts with the surface of the melt. After confirming its contact, the crystal is slowly raised keeping the contact. As soon as the V$_2$O$_5$ melt converts to VO$_2$ by the deoxidizing reaction, the VO$_2$ deposits on the seed crystal. The seed crystal was raised at a rate of 5 mm. per day so that the rate of deoxidizing reaction was balanced with the rate of growth of the seed crystal. According to this embodiment, a single crystal having a length of 10 mm. could easily be obtained. It was observed that the single crystal obtained in this manner was certainly VO$_2$. According to the results of X-ray diffraction analysis, the crystal belongs to the monoclinic system.

Figure 6:
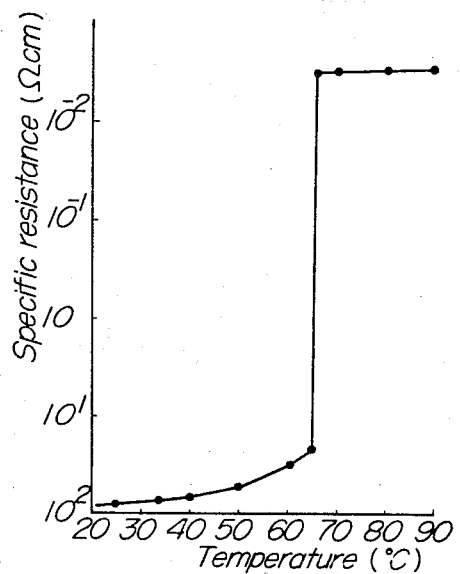
FIG. 6 is a graphical representation of electrical resistance as a function of temperature for the single crystal of vanadium dioxide obtained by the method of the present invention.

From the above descriptions with regard to the preferred embodiments of the invention, it will be seen that single crystals of VO$_2$ can be grown by any of the procedures. The prismatic shaped VO$_2$ single crystals obtained in the Examples 1, 3 and 4 have a crystal structure of monoclinic system at room temperature. The longitudinal direction of the crystals is [100] while side faces are {011} faces. Above the transition point of 65° C., the crystals turn to tetragonal system (rutile-type structure) in which crystal orientation in its longitudinal direction is [001] and side faces are {110} faces. The VO$_2$ single crystals obtained in the Examples 2, 5, 6 , 7 and 8 have mainly a chunky form. These chunky crystals are identical in their basic properties with the prismatic-shaped crystals, but with a cleavage plane of {011}. Electrical resistance of these VO$_2$ single crystals as a function of temperature is graphically shown in FIG. 6. From the curve shown therein, it will be seen that electrical resistance shows a rapid decrease of about three orders of magnitude at about 65.5° C., while the corresponding temperature variation is only about 0.5° C. This is a very abrupt change and such a change in VO$_2$ single crystals and powder has not yet been reported. From the above facts, it can be concluded that the VO$_2$ single crystals prepared by the present invention have a composition close to a stoichiometric one. This sharp and abrupt decrease in the electrical resistance at 65.5° C. will enlarge an industrial availability of VO$_2$ crystals.

What is claimed is:

1. A method for growing single crystals of vanadium dioxide comprising heating vanadium pentoxide in an inert gas atmosphere at a temperature between the melting points of vanadium pentoxide and vanadium dioxide and maintaining the molten vanadium pentoxide at said temperature in said inert gas atmosphere for a time period from 4 to 10 days so as to grow single crystals of vanadium dioxide in the molten vanadium pentoxide.

2. A method for growing single crystals of vanadium dioxide defined in claim 1, wherein said vanadium pentoxide is heated at a temperature of 900 to 1,150° C.

3. A method for growing a single crystal of vanadium dioxide according to claim 1, in which said inert gas atmosphere is nitrogen.

4. A method for growing a single crystal of vanadium dioxide according to claim 1, in which said inert gas atmosphere is argon.

5. A method for growing a single crystal of vanadium dioxide according to claim 1, in which said molten vanadium pentoxide is maintained at 900° C. in an inert gas atmosphere so as to cause vanadium pentoxide to convert to vanadium dioxide and to grow the vanadium dioxide as a prismatic-shaped crystal in the vanadium pentoxide melt.

6. A method for growing a single crystal of vanadium dioxide according to claim 1, in which said molten vanadium pentoxide is maintained at 1,150° C. to grow a chunky crystal of vanadium dioxide near the surface of the molten vanadium pentoxide.

7. A method for growing a single crystal of vanadium dioxide according to claim 1, in which vanadium dioxide formed by maintaining said molten vanadium pentoxide in an inert gas atmosphere at a temperature ranging from 1,000° to 1,100° C. is deposited on a seed crystal of vanadium dioxide added to said melt.

8. A method for growing a single crystal of vanadium dioxide according to claim 7, in which said seed crystal is suspended in said molten vanadium pentoxide and is grown by the deposition of vanadium dioxide thereon.

9. A method for growing a single crystal of vanadium dioxide according to claim 7, in which said seed crystal of vanadium dioxide is brought into contact with the surface of the molten vanadium pentoxide and the seed crystal is moved away from the surface of said molten vanadium pentoxide at a rate corresponding to the longitudinal growth of said crystal while maintaining contact with said melt.

10. A method for growing a single crystal of vanadium dioxide according to claim 5, in which the body of molten vanadium pentoxide is slowly moved relative to the maximum temperature zone, said zone being at a constant temperature above 690° C., whereby maximum crystal growth is effected in the direction of said movement at a constant temperature higher than 690° C. in an inert gas atmosphere.

References Cited

UNITED STATES PATENTS

| 2,180,353 | 11/1939 | Foster | 23—19.1 |
| 2,482,311 | 9/1949 | Asak | 23—19.1 |
| 2,665,970 | 1/1954 | Halpern | 23—140 |
| 3,002,320 | 10/1961 | Theurer | 23—273 |
| 3,244,488 | 4/1966 | Linares | 23—301 |

FOREIGN PATENTS 529,224  9/1951  Canada.

OTHER REFERENCES

"Preparation of Vanadium Monoxide," by Mekkel Frandesen, June 2, 1952, vol. 74, p. 5046 from Laboratory Division, U.S. Naval Guns Factory.

NORMAN YUDKOFF, *Primary Examiner.*

G. P. HINES, *Assistant Examiner.*